(12) United States Patent
Meyer et al.

(10) Patent No.: US 10,526,465 B2
(45) Date of Patent: Jan. 7, 2020

(54) PROCESSING OF AROMATIC THERMOSETTING COPOLYESTERS INTO FOAMS AND BULK PARTS OF ADAPTABLE DENSITY

(71) Applicant: ATSP Innovations, Champaign, IL (US)

(72) Inventors: Jacob Meyer, Champaign, IL (US); Mete Bakir, Urbana, IL (US)

(73) Assignee: ATSP Innovations, LLC, Champaing, IL (US)

( * ) Notice: Subject to any disclaimer, the term of this patent is extended or adjusted under 35 U.S.C. 154(b) by 190 days.

(21) Appl. No.: 15/783,131

(22) Filed: Oct. 13, 2017

(65) Prior Publication Data
US 2019/0040220 A1    Feb. 7, 2019

Related U.S. Application Data

(60) Provisional application No. 62/540,602, filed on Aug. 3, 2017.

(51) Int. Cl.
*C08K 3/04*       (2006.01)
*C08J 9/228*      (2006.01)

(52) U.S. Cl.
CPC ............... *C08J 9/228* (2013.01); *C08K 3/04* (2013.01)

(58) Field of Classification Search
CPC ................. C08J 9/228; C08K 3/04–3/046
See application file for complete search history.

(56) References Cited

U.S. PATENT DOCUMENTS

| | | | |
|---|---|---|---|
| 5,439,541 A | 8/1995 | Economy | |
| 9,534,138 B2 | 1/2017 | Economy et al. | |
| 2002/0183438 A1* | 12/2002 | Amarasekera | C08K 5/00 524/495 |
| 2003/0092875 A1 | 5/2003 | Okamoto | |
| 2010/0311866 A1* | 12/2010 | Huang | C08K 7/24 523/137 |
| 2015/0118430 A1* | 4/2015 | Korzhenko | C08K 3/04 428/36.9 |
| 2015/0284586 A1* | 10/2015 | Economy | C23C 4/00 427/485 |

OTHER PUBLICATIONS

Bita Vaezian, Jacob L. Meyer and James Economy. "Processing of aromatic thermosetting copolyesters into foams and bulk parts: characterization and mechanical properties" Polym. Adv. Technol. 2016, 27 1006-1013. Published online Feb. 11, 2016. (Year: 2016).*

(Continued)

*Primary Examiner* — Michael M Dollinger
*Assistant Examiner* — Christina H. W. Rosebach
(74) *Attorney, Agent, or Firm* — Adam K. Sacharoff; Much Shelist, P.C.

(57) ABSTRACT

A novel Aromatic Thermosetting Copolyester (ATSP) fully dense sheets can be processed by recycling the foam structure with unique combination of properties including mechanical strength and high temperature performance (compared to PEEK) to help improve part functionality, gain long-term reliability and cost savings. ATSP machinable plates can be used in valves, fittings, bearing, bushing, seals, aerospace parts and pump components.

18 Claims, 17 Drawing Sheets

Example structures of ATSP oligomers along with their curing reaction.

(56) References Cited

OTHER PUBLICATIONS

Dan Frich, Konstantin Goranov, Lizabeth Schneggenburger, and James Economy. "Novel High-Temperature Aromatic Copolyester Thermosets: Synthesis, Characterization, and Physical Properties" Macromolecules 1996, 29, 7734-7739 (Year: 1996).*

Translation of JP 2005082832 by Shimizu et al. (Year: 2005).*

Processing of aromatic thermosetting copolyesters into foams and bulk parts; Vaezian et al., Dec. 26, 2015, Polymers Advanced Technologies.

An Improved Tribological Polymer-Coating System for Metal Surface; Zhang et al., May 15, 2010; Science + Business Media.

\* cited by examiner

Example structures of ATSP oligomers along with their curing reaction.

Photograph of foamed ATSP sample.

Particle size (weight and number) distribution of C2A2 passed through 90 μm sieve.

TGA curves of CBAB foam in air.

Compressive stress vs strain of C2A2 and CBAB foam structures.

Tensile stress vs strain of C2A2 and CBAB foam structures.

Particle size (weight and number) distribution of CBAB passed through 90 μm sieve.

(a)
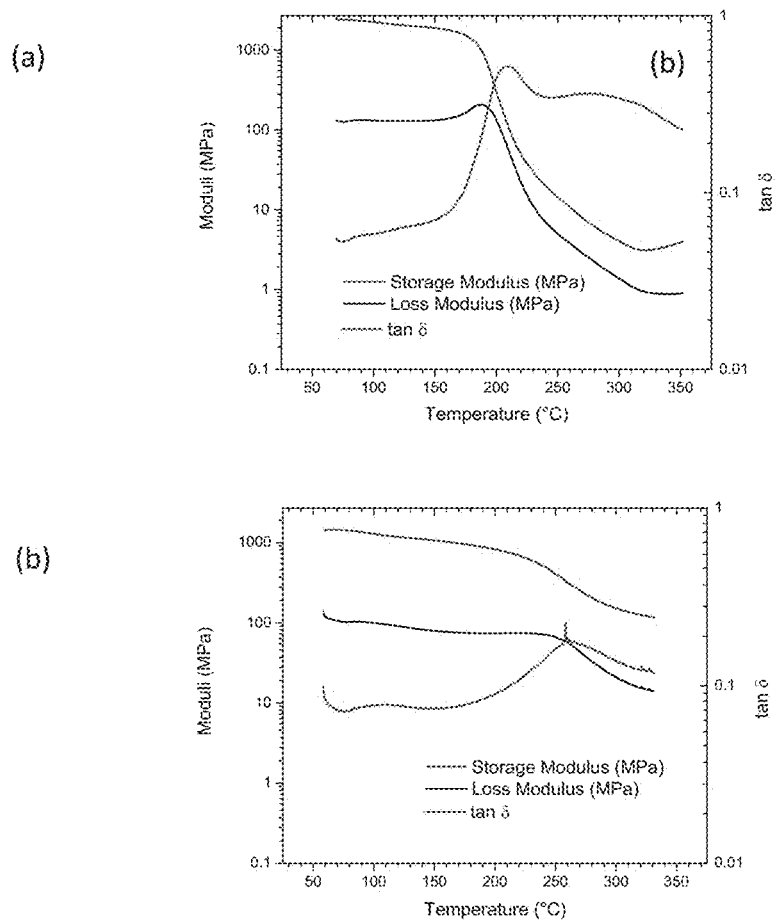
(b)
Figure 8. DMA results for neat ATSP samples: (a) C2A2, from Example 1-D, and (b) CBAB.
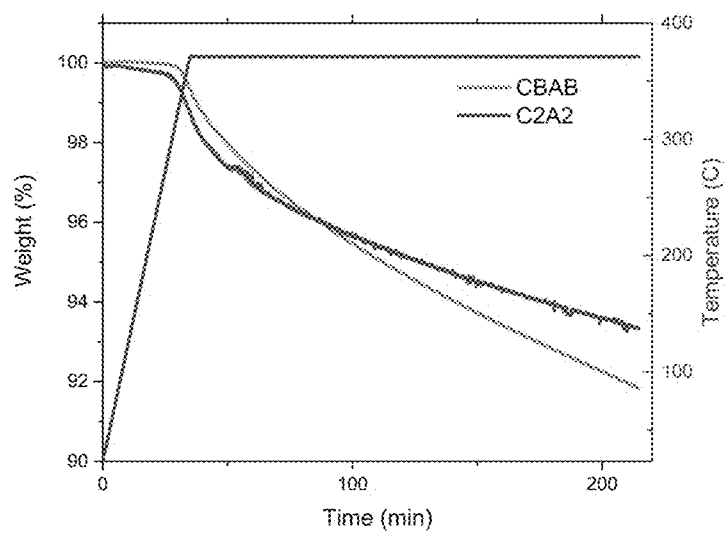
Figure 9.
Isothermal heat stability of neat ATSP, C2A2 and CBAB.

The compression strength of C2A2 and CBAB fully dense structures.

The tensile strength vs strain of C2A2 fully dense structures.

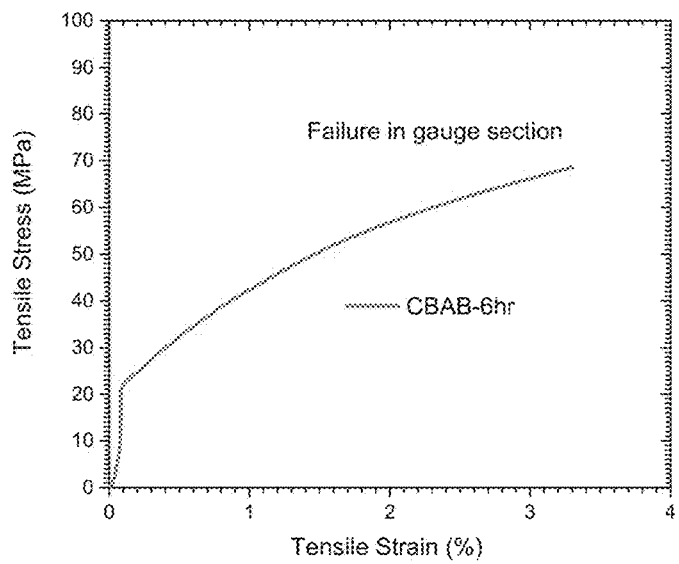
Figure 12.
The tensile strength vs strain of CBAB fully dense structures.
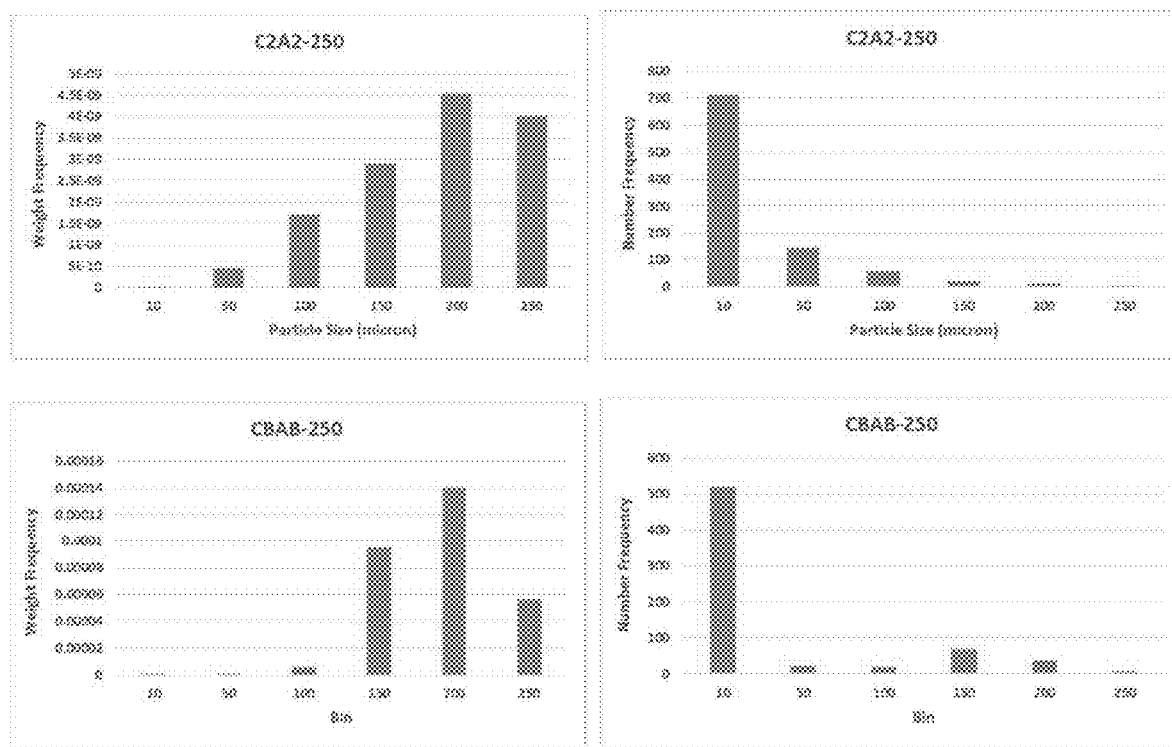
Figure 13. Particle size (weight and number) distribution of C2A2 and CBAB passed through 250 μm sieves.

The ultimate compression strength vs density.

The compression strength of ATSP/PTFE (75:25) fully dense structures.

The compression strength of ATSP/PTFE (95:05) fully dense structures.

DMA results for neat ATSP and ATSP/PTFE (75:25) composite samples.

COF versus wear rate for neat C2A2, CBAB as well as C2A2/PTFE and CBAB/PTFE composites pins.

SEM images of the powder combinations. An isolated individual oligomer particle decorated with nanofiller particles (a), and distributed GNP (b), CNT (c) and CB (d) nanoparticles on the oligomer particle surfaces.

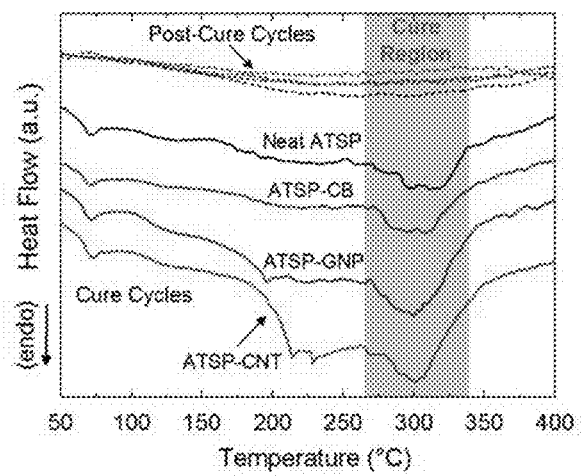
Figure 20. DSC analyses of cure and post-cure characteristics of the nanofiller-ATSP powder combinations. Tests were performed under nitrogen. The heating rate was 10 °C/min.
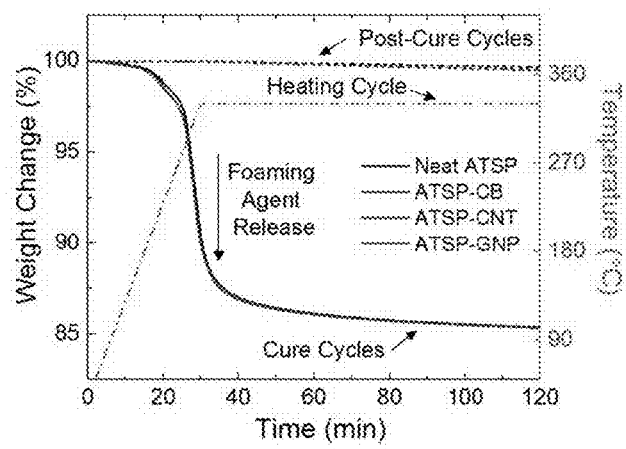
Figure 21. TGA analyses of cure and post-cure characteristics of the nanofiller-ATSP powder combinations. Tests were performed under nitrogen. The heating rate was 10 °C/min.

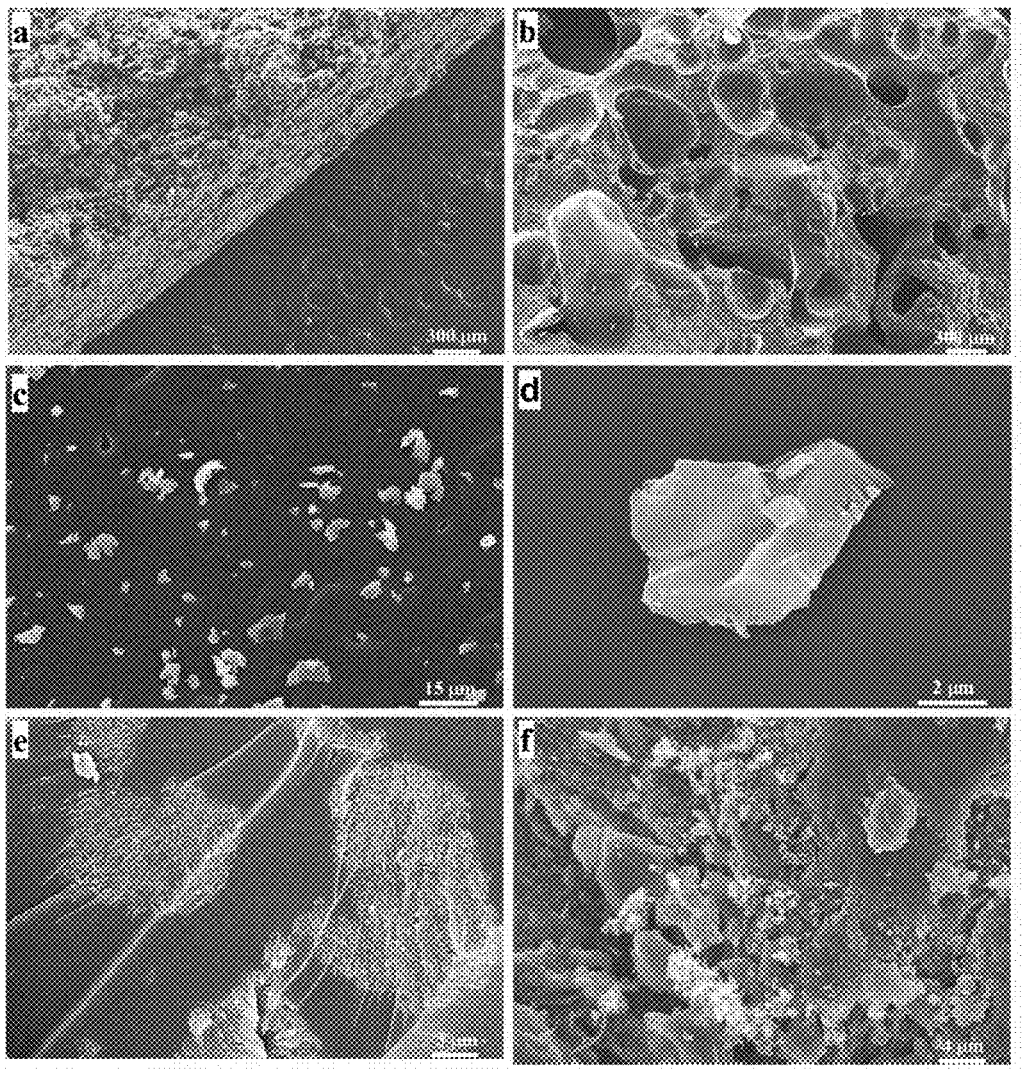
Figure 22. SEM images of nanocomposite foams. ATSP-GNP specimen on cross-section (a), surface topology (b), nanofiller distribution on pore surface (c), and an isolated GNP flake (d). ATSP-CNT sample nanofiller distribution (f). ATSP-CB sample nanofiller distribution (e).

XRD spectra of the neat foam and the nanocomposite foams.

Dilatometer analyses of linear thermal expansions on the neat foam and the nanocomposite foams. Tests were performed in air. The heating rate was 3 °C/min.

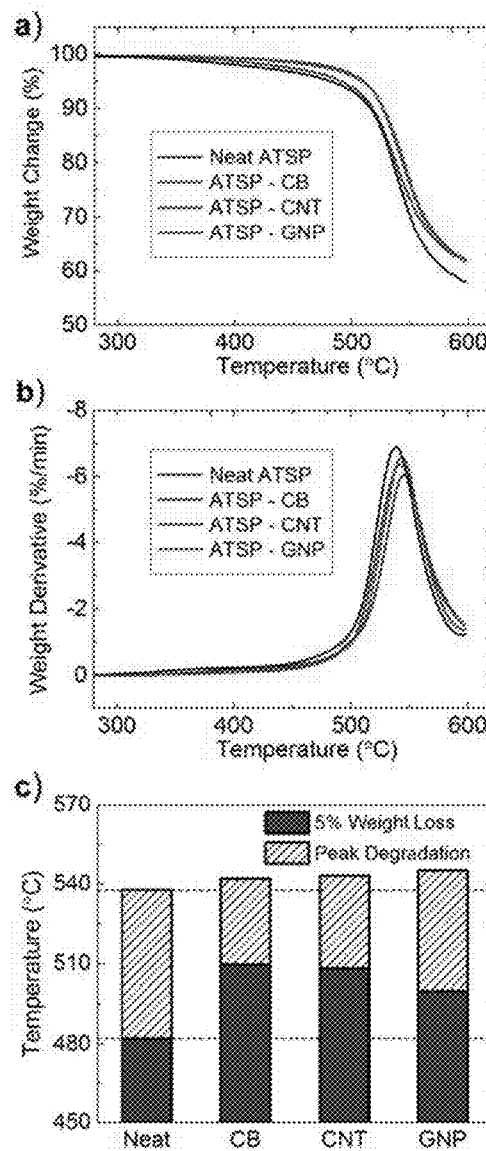
Figure 25. TGA measurements of thermal degradation stability of the nanocomposite foams. Thermogravimetric analyses (TG) (a), derivative thermogravimetric analyses (DTG) (b) and comparative results (c). Tests were performed under nitrogen. The heating rate was 10 °C/min.

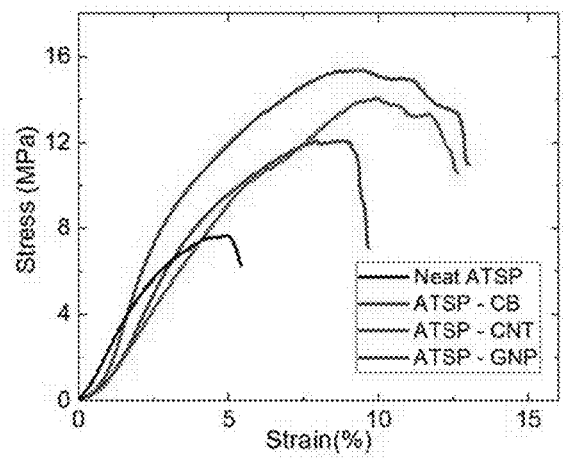
Figure 26. Representative compressive stress-strain curves of the nanocomposite foams.
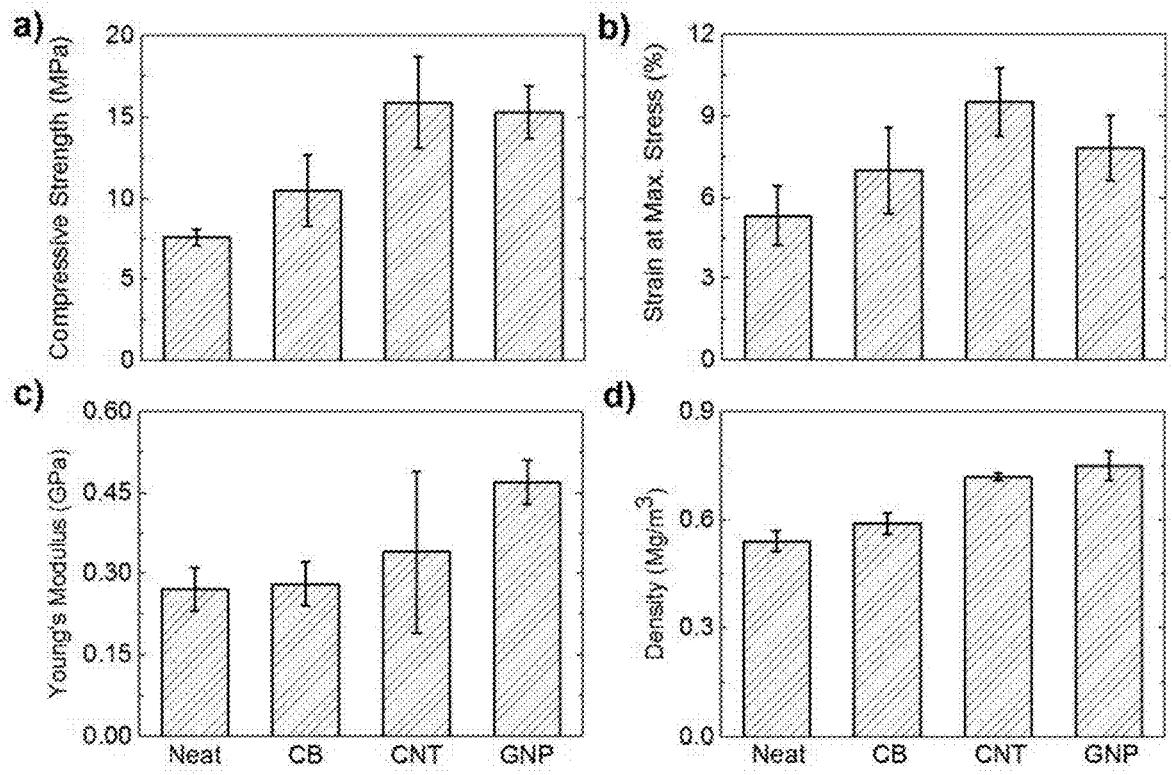
Figure 27. Compressive mechanical properties of the nanocomposite foams. Compressive strength (a), strain measured at maximum stress (b), Young's modulus (c) and structural density (d).

PROCESSING OF AROMATIC THERMOSETTING COPOLYESTERS INTO FOAMS AND BULK PARTS OF ADAPTABLE DENSITY

CROSS REFERENCE TO RELATED APPLICATIONS

The present invention claims priority to Provisional Application 62/540,602 filed Aug. 3, 2017.

BACKGROUND OF THE INVENTION

Weight reduction is a benchmark that has always been critical to the aerospace and automotive industries. Metal replacement is often key to reducing weight, cost, production times and processing cycles. Polymers can be considered for metal replacement for a wide variety of applications in a range of uses such as manufacturing equipment to automotive engines, aircraft components, oil and gas process and extraction equipment, bushings, bearings, seals, and gears.

Aromatic ThermoSetting coPolyesters (ATSP) are a relatively new multi-purpose resin that demonstrates robust performance in severe thermal and mechanical environments while providing an effective alternative to metal in many situations. ATSP can be fabricated as bulk materials with technical properties that are equivalent or superior to metal parts, with the advantages of lighter weight, lower cost, and nearly limitless design potential. Given recent advances, the synthetic development of ATSP was a major innovation in the field of polymer science. ATSP exhibits excellent specific strength, stiffness and dimensional stability at high temperature with a glass transition temperature as high as 305° C. and a short-term service temperature up to 350° C. and 425° C. in air and nitrogen, respectively. ATSP also shows extreme flame resistance, ablative character, and excellent performance as adhesives, rigid foams (by utilizing the evolution of acetic acid, the by-product of crosslinking), and as tribological wear coatings with low coefficient of friction, excellent wear and abrasion resistance. ATSP is an all-aromatic polyester with superior environmental and chemical resistance with intrinsic resistance to weathering (moisture pick-up <0.3%). ATSP displays a unique feature among high temperature thermosets, known as interchain transesterification reactions (ITR), which allows solid-state bonding between fully cured lamina or other solid bodies.

Previous testing of their capabilities showed excellent performance as adhesives, matrices for composites, tribological coatings and dielectrics for microelectronics. ATSP has the following features that make it suitable for many different applications:

a. ATSP is designed for high-temperature stability with a glass transition temperature ranging from 210-305° C.;
b. It has a unique ability to react with itself even after curing, undergoing interchain transesterification reactions (ITR). This can offer valuable functionality during processing and during use, allowing reincorporation of wear debris into the coating surface thus extending lifetime; and
c. ATSP can be recycled to its original oligomers for reuse.

BRIEF SUMMARY OF THE INVENTION

Embodiments of the present invention provide a method for fabricating bearings and machining grade materials from aromatic thermosetting copolyesters (ATSP), and the process of making bulk ATSP with various densities using different formulations/chemistries, and incorporating additives to enhance properties. Cured ATSP has high specific mechanical properties and can be used in applications where performance at elevated temperatures is required. ATSP has enhanced wear properties relative to state of art polymeric materials and is naturally abrasion resistant. ATSP exhibits excellent mechanical and thermal properties, and low flammability. These properties indicate utility in the aircraft, automotive, semiconductor, and chemical processing industries.

In an embodiment of the present invention, fully dense ATSP plates as well as bulk ATSP with variable densities are fabricated by mixing ATSP oligomers, curing to make foams, grinding the cured material and sintering the cured powders by applied heat/pressure. In accordance with such embodiments, ATSP oligomers are produced by reacting ATSP precursor monomers to form an oligomer having a carboxylic acid end group and an oligomer having an acetoxy end group. ATSP oligomers are mixed and cured to produce low density/high strength foams. ATSP cured foams are then ground to produce powders with controlled particle size distributions. The cured ATSP powders are then loaded into a mold and compressed in a hot press where the sample are heated and sintered under various pressures to produce bulk ATSP with a range of densities.

In another embodiment of the present invention, ATSP cured powders are blended with polytetrafluoroethylene (PTFE) and sintered to produce fully dense ATSP/PTFE bulk structure. Thermomechanical and tribological utility is demonstrated for these blended articles.

Rigid and mechanically robust ATSP foams and fully dense lightweight materials have been prepared. ATSP machinable grades ranging in density offers a combination of superlative properties that allow it to replace metal in some of the most severe end-use environments. This system combines the ease of processability with low cost manufacturing, long term environmental stability and unique combination of properties including mechanical strength, high level of dimensional stability and high temperature performance (compared to Polyaryletheretherketone, PEEK) to improve part functionality, gain long-term reliability and cost savings.

The present invention is directed in one or more embodiments to using aromatic copolyester oligomers and carbonaceous nanofillers (graphene nanoplatelets, carbon nanotubes, carbon black, etc.) to produce foam or thick section (bulk) composites. It has been determined that ATSP oligomers react with the nanofillers, especially with their oxygen-bearing moieties present on the nanofillers (carboxylic acids, hydroxyls, etc.) to produce a chemically contiguous structure. The nanofillers are by these reactions linked to each other via the aromatic copolyester backbone. This produces useful changes in the thermomechanical properties relative to the neat material. The type of reactions that link the aromatic copolyester backbone could include esterification, amidization, transesterification, transamidization, and other step growth reactions, as well as glicidyl ether reactions. As such it would be novel for any production of a product where a reaction occurs between the carbon nanofiller and the backbone polymer during the cure reaction of the polymer and links that into the polymer chain. This could occur either by reaction with functional end groups (in our case carboxylic acids and acetoxy units) or via a transreaction. Specifically of interest is the case here of crosslinkable aromatic copolyesters. In addition, it would be novel when this is used for or in any subsequent forming or fabrication process where transesterification might be used within the cured article or between the cured article and an adjacent article.

BRIEF DESCRIPTION OF THE DRAWINGS

FIG. 8 illustrates DMA results for neat ATSP samples, (a) C2A2, and (b) CBAB.

FIG. 9 illustrates isothermal heat stability of neat ATSP, C2A2 and CBAB.

FIG. 12 illustrates the tensile strength vs strain of CBAB fully dense structures.

FIG. 13 illustrates particle size (weight and number) distribution of C2A2 and CBAB passed through 250 μm sieves.

FIG. 20 illustrates cure and post-cure calorimetric characteristics of the nanofiller-ATSP powder combinations.

FIG. 21 illustrates cure and post-cure characteristics of the nanofiller-ATSP powder combinations.

FIG. 22 illustrates the microstructure of ATSP nanocomposite foams via scanning electron microscopy.

FIG. 25 illustrates thermal degradation stability of the nanocomposite foams.

FIG. 26 illustrates representative compressive stress-strain curves of the nanocomposite foams.

FIG. 27 illustrates compressive mechanical properties of the nanocomposite foams

DETAILED DESCRIPTION OF THE INVENTION

Figure 1:
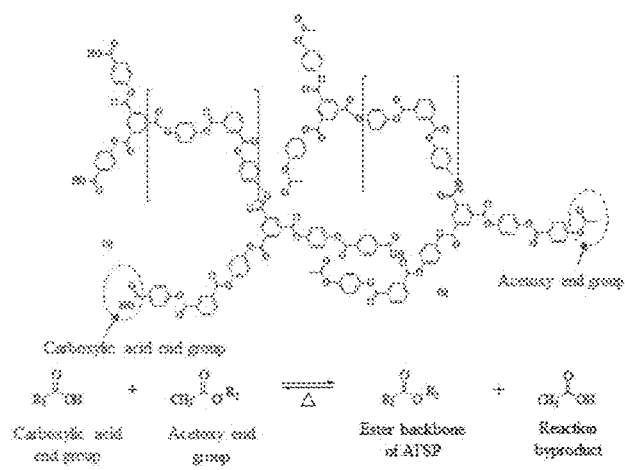
FIG. 1 illustrates example structures of ATSP oligomers along with their curing reaction.

In a first embodiment, the present invention provides a method for fabricating fully dense bulk ATSP with specific formulation. In accordance with such embodiments, ATSP oligomers are produced by reacting ATSP precursor monomers to form an oligomer having a carboxylic acid end group and an oligomer having an acetoxy end group. ATSP oligomers are mixed and cured at elevated temperature to produce low density/high strength foams. Curing the oligomers causes the end groups to react and form a cross-linked network. Full cured ATSP foams are then ground and sieved to produce powders with controlled particle size distributions. The cured ATSP powder are then loaded into a mold and compressed in a hot press where the samples are heated and sintered under pressure.

Another embodiment of this invention is a method for producing fully dense bulk ATSP using another formulation and following the exact same process as mentioned above.

Another embodiment of this invention is a method for producing bulk ATSP with various densities by changing the applied pressure while sintering.

The addition of PTFE has been shown to aid in lowering the coefficient of friction. ATSP/PTFE sheets are made using different concentrations and tested.

Another embodiment of this invention is a method for producing ATSP nanocomposite foams with improved mechanical properties.

Embodiments of the present invention provide methods of forming ATSP copolyesters by reacting precursor monomers: 1,4-phenylene diacetate (HQDA), [1,1'-biphenyl]-4,4'-diyl diacetate (BPDA), 4-acetoxybenzoic acid (ABA), trimesic acid (TMA) and isophthalic acid (IPA) into cross-linkable low molecular weight oligomers.

Example 1—Fabricating Fully Dense Bulk C2A2

A. Materials and Oligomer Synthesis

The synthesis of a two part oligomeric system, one consisting of carboxylic acid end groups (hereinafter denoted with the reference character "C" with "C2" designating a specific formulation) and the other consisting of acetoxy end groups (hereinafter denoted with the reference character "A" with "A2" designating a specific formulation), is described below. As a first step, hydroquinone diacetate (hereinafter HQDA) was synthesized by acetylation of hydroquinone (hereinafter HQ). In this case, 440 g of HQ was mechanically stirred in 850 mL of acetic anhydride (molar ratio of about 4:8.9) in a cylindrical vessel in an ice-water bath at 10° C. at which point 2-3 drops of sulfuric acid was added to catalyze the acetylation reaction. The solution temperature immediately increased to 80-85° C. due to the exothermic reaction. After allowing the solution to cool to room temperature, HQDA was precipitated out with distilled water. HQDA was then filtered, washed with water and dried in a vacuum oven at 70° C. for 12 hours. The reaction yield was above 98%. 4-acetoxybenzoic acid (hereinafter ABA) was produced in a manner analogous to HQDA with a molar ratio of 4:8.7 of 4-hydroxybenzoic acid (hereinafter HBA) mechanically stirred in a large excess of acetic anhydride at room temperature. Upon addition of 2-3 drops of sulfuric acid the temperature increased to 45° C. After allowing the solution to cool to room temperature, ABA was precipitated out with distilled water. ABA was then filtered, washed with water and dried in a vacuum oven at 70° C. for 12 hours. The reaction yield was above 95%.

The other monomers trimesic acid (hereinafter TMA) and isophthalic acid (hereinafter IPA) were purchased from Alfa-Aesar and used without modification.

To produce carboxylic acid end-capped oligomer C2, 76.9 g TMA, 284.3 g HQDA, 243.2 g IPA, and 395.6 g ABA were mixed in a 2 L reactor flask. The flask was equipped with a three-neck head connected to an inlet inert gas, a screw-type impeller driven by an overhead mechanical stirrer, a J-type thermocouple, and an Allihn-type condenser valve to offer a toggle between reflux and distillation modes. The reactor was continuously purged with argon while emplaced within a Glas-Col aluminum-housed electric heating mantle operated via temperature controller with the thermocouple operating as feedback. The reactor was heated to 260° C. for 30 min to obtain a low-viscosity melt during which stirring was maintained at 300 revolutions per minute (rpm) and which evidenced a substantial acetic acid by-product which was refluxed during this stage. After refluxing for 30 minutes, the condenser was toggled to distillation mode and acetic acid condensation by-product was collected in an Erlenmeyer flask and the mass of the acetic acid was continuously monitored by digital weighing balance, which indicated the extent of reaction. The reaction was stopped with 250 mL of acetic acid collected (theoretical 307.7 mL). Reaction yield of the C2 oligomer was about 692 g (approximately 97.7%). The C2 oligomer product, a viscous melt, was ground into a fine powder and then sieved through a 250 μm mesh screen.

For the acetoxy end-capped oligomer A2, 87.1 g TMA, 402.2 g HQDA, 37.6 g IPA, and 373.1 g of ABA were used with the same procedure as above. 253 mL of acetic acid was collected after 3 hours at 260° C. (theoretical 298.3 mL) and reaction yield of the A2 oligomer was about 694 g (approximately 99%). The A2 oligomer product, a viscous melt, was ground into a fine powder and then sieved through a 250 μm mesh screen. Thermogravimentric analysis (TGA) and differential scanning calorimetry (DSC) were used to confirm that both oligomers were of good quality by observing no melting points or mass losses corresponding to those characteristic of its substituent monomers.

B. ATSP Foam Structure Fabrication

ATSP foam structures were obtained by simply mixing the two dry oligomer powders together via vigorous shaking in a container by hand followed by application of heat in a vessel lined with a PTFE-coated fiberglass fabric. C2 and A2 oligomers were mixed (C2:A2 at 1.1:1 weight ratio) and cured at 200° C. for 1 hr, 270° C. for 2 hr followed by 330° C. for 3 hr. Curing was performed under vacuum to reduce oxidation.

Figure 2:
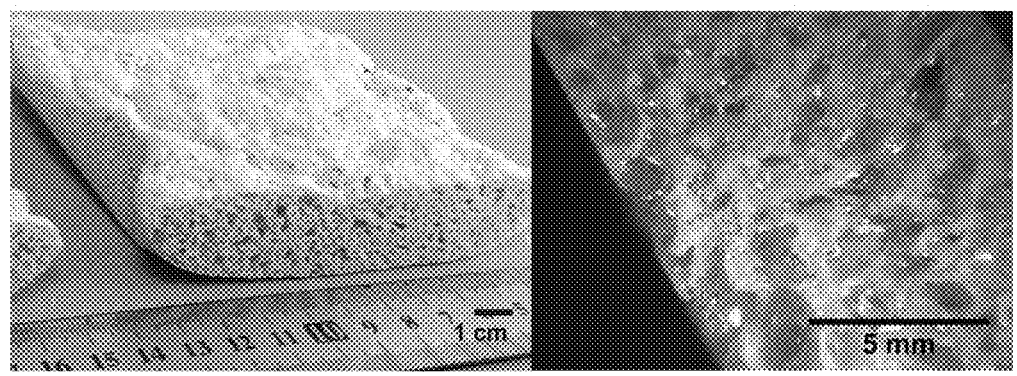
FIG. 2 illustrates photographs of foamed ATSP sample.

Acetic acid is the by-product upon crosslinking of carboxylic end group and acetoxy end group oligomers (FIG. 1). The low density/high strength foamed structures of ATSP were obtained by evolution of acetic acid (FIG. 2). The foam density was about 0.36 g/cm³.

C. Fine ATSP Powders Fabrication

Figure 3:
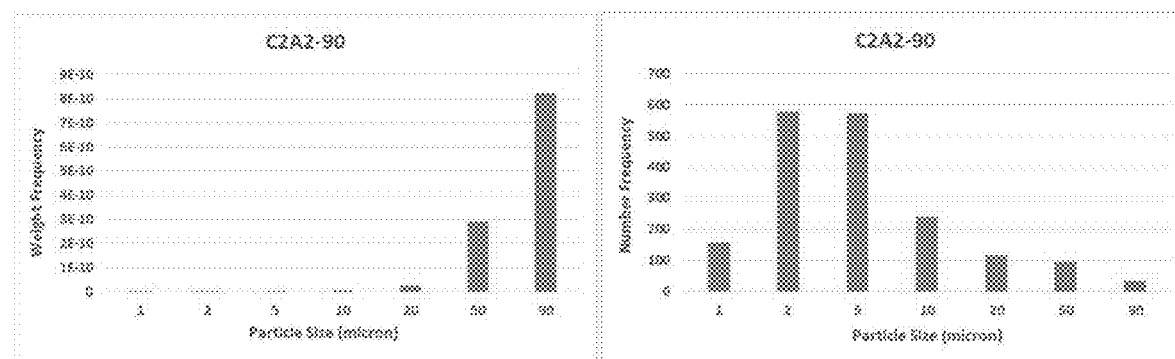
FIG. 3 illustrates particle size (weight and number) distribution of C2A2 passed through 90 μm sieve.

C2A2 foamed structure was ground and sieved to produce powders with controlled particle size distributions in the range of <90 μm. A Col Int. Tech. FW 800 was used for crushing and grinding the C2A2 foam structure and the produced particles were automatically screened through mesh of 90 μm using a Retsch® Sieve Shaker machine. FIG. 3 shows particle size distribution (weight and number frequency) of C2A2 passed through 90 μm sieve.

D. Fully Dense ATSP Material Fabrication

For making fully dense C2A2, the fine cured C2A2 powders (<90 μm) were loaded into a (6¼"×6¼") mold and compressed at 1000 psi in a hot press under vacuum. The sample was heated to 340° C. over 2 hr and then sintered at 340° C. for 2 hr. In another experiment the sample was sintered at 340° C. for 6 hr. The final products were a fully consolidated part with the density of 1.32 g/cm³.

Example 2—Fabricating Fully Dense Bulk CBAB

A. Materials and Oligomer Synthesis

The synthesis of a two part oligomeric system, one consisting of carboxylic end groups (hereinafter CB) and the other consisting of acetoxy end groups (hereinafter AB), is described below. To increase the glass transition temperature of the resin by introduction of a more rigid moiety within the backbone chain, the hydroquinone (which is the ATSP component most sensitive to oxidation and to volatilization by transesterification at article surfaces by virtue of having the lowest sublimation point) was replaced by units that are more thermally stable. Hydroquinone diacetate was replaced with biphenol diacetate in carboxylic acid- and acetoxy-capped oligomers to increase the oxidative stability of oligomers.

As a first step, biphenol diacetate (hereinafter BPDA) was produced in a manner analogous to HQDA with a large excess of acetic anhydride utilized for fluidity and ease of handling, 2.69 moles (500 g) of biphenol (hereinafter BP) to 8.9 moles (920 g or 850 mL) of acetic anhydride in a cylindrical vessel in an ice-water bath at 10° C. at which point 2-3 drops of sulfuric acid was added to catalyze the acetylation reaction. The solution temperature immediately increased to 80-85° C. due to the exothermic reaction. After allowing the solution to cool to room temperature, BPDA was precipitated out with distilled water. BPDA was then filtered, washed with copious volumes of distilled water and dried in a convection oven at 70° C. for 48 hours. The reaction yield was above 95%. 4-ABA was produced as described above. The other monomers, TMA and IPA, were purchased from Alfa-Aesar and used without modification or additional purification steps.

To produce CB, 129.4 g TMA, 333 g BPDA, 204.7 g IPA, and 332.9 g ABA were mixed in a 2 L cylindrical reactor flask. The flask was equipped with a three-neck head connected to an inlet inert gas, a screw-type impeller driven by an overhead mechanical stirrer, a J-type thermocouple, and an Allihn-type condenser valve to offer a toggle between reflux and distillation modes. The reactor was continuously purged with argon while emplaced within a Glas-Col aluminum-housed electric heating mantle operated via temperature controller with the thermocouple operating as feedback. The reactor was heated to 260° C. for 30 min to obtain a low-viscosity melt during which stirring was maintained at 300 revolutions per minute (rpm) and which evidenced a substantial acetic acid by-product which was refluxed during this stage. After refluxing for 30 minutes, the condenser was toggled to distillation mode and acetic acid condensation by-product was collected in an Erlenmeyer flask and the mass of the acetic acid was continuously monitored by digital weighing balance, which indicated the extent of reaction. The reaction was stopped with 220 mL of acetic acid collected (theoretical 258 mL). Reaction yield of the CB oligomer was about 696 g (approximately 94%). The CB oligomer product, a viscous melt, was ground into a fine powder. Theoretical molecular weight is determined by subtraction of the number of moles of acetoxy functional groups in the reactor feed mass multiplied by the mass of acetic acid from the molecular weight of the feed monomers times their monomer ratio within the feed mass. The CB oligomer product, a viscous melt at 260° C. and a brittle solid at 23° C., was ground into a fine powder and then sieved through a 250 μm mesh screen.

For the AB oligomer, 134.6 g TMA, 346.1 g ABA, and 519.3 g BPDA were used with the same procedure as above. 195 mL of acetic acid was collected after 3 hours at 260° C. (theoretical 230 mL) and reaction yield of the AB oligomer was about 731 g (approximately 95%). Theoretical molecular weight is determined by subtraction of the number of moles of carboxylic acid functional groups in the reactor feed mass multiplied by the mass of acetic acid from the molecular weight of the feed monomers times their monomer ratio within the feed mass. The AB oligomer product, a viscous melt at 260° C. and a brittle solid at 23° C., was ground into a fine powder and then sieved through a 250 μm mesh screen.

B. ATSP Foam Structure Fabrication

ATSP foam structures were obtained by simply mixing together the two oligomer powders together via vigorous shaking in a container by hand followed by application of heat. CB and AB oligomer were mixed (CB:AB at 1:1 weight ratio) and cured at 200° C. for 1 hr, 270° C. for 2 hr followed by 330° C. for 3 hr. Curing was done under vacuum to reduce oxidation. The foam density was about 0.38 g/cm$^3$. The foam exhibited high thermal stability up to 250° C. as shown in FIG. 4.

Figure 4:
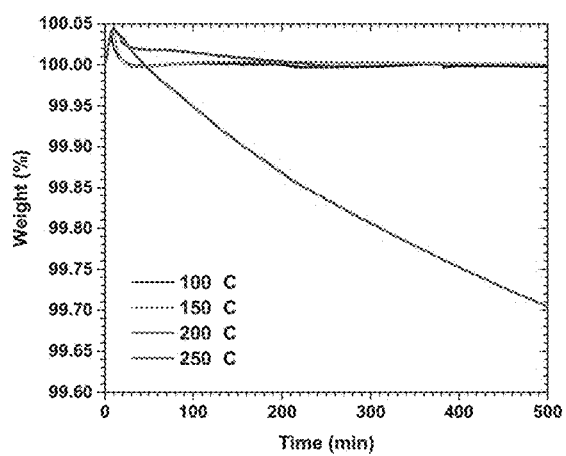
FIG. 4 illustrates thermogravimetric analysis (TGA) curves of CBAB foam in air.

FIG. 4 show thermal stability of CBAB foams ramped up and held for 8 hours at 100, 150, and 250° C. and 4 hours at 200° C. in air. The samples evidenced no weight loss at 100 and 150° C., with a weight loss of 0.003% and 0.3% at 200 and 250° C., respectively.

Figure 5:
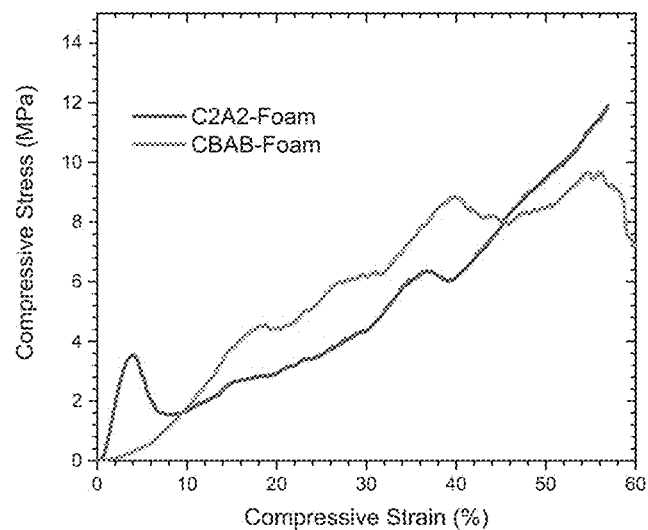
FIG. 5 illustrates compressive stress vs strain of C2A2 and CBAB foam structures.

The compression strength of ATSP foamed structures was determined following ASTM D1621-10. The test specimen square in cross section, 25.8 cm$^2$ area and 2.54 cm thick, obtained and were tested under compression in an Instron mechanical testing machine. A crosshead displacement of 2 mm/min was utilized and the compressive strength vs strain is reported in FIG. 5. The C2A2 foam structure, from Example 1.B, evidenced a yield strength of 3.62±1.0 MPa, while the CBAB foam structure showed a yield strength of 7.51±1.0 MPa.

The tensile strength of ATSP foam structures was determined with guidance from ASTM D638-14. The Type IV sample specimen with the dumbbell shape and thickness of 2 mm were used for foam structures and tested in tension in an Instron mechanical testing machine. The straight gage section had a length of 30 mm and a width of 4 mm.

Figure 6:
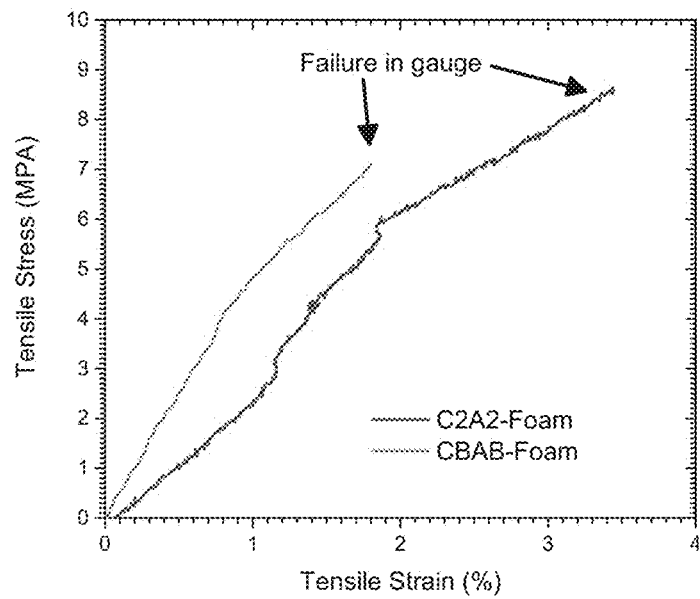
FIG. 6 illustrates tensile stress vs strain of C2A2 and CBAB foam structures.

The tensile strength vs strain of C2A2 foam structure, from Example 1.B, and CBAB foam structure was plotted in FIG. 6. Foam ultimate tensile strength, percent elongation, and modulus were reported in Table 1. Tensile strength was reported as the breaking load divided by sample cross-sectional area, percent elongation will be determined by extensometer, and modulus by dividing the difference in stress corresponding to any segment of section on this straight line by the corresponding difference in strain in the initial linear portion of the curve.

TABLE 1

Tensile properties of C2A2, from Example 1.B, and CBAB foam structures.

| Formulation | Tensile Stress (MPa) | Modulus (MPa) | Elongation (%) |
| --- | --- | --- | --- |
| C2A2 | 8.1 ± 1.8 | 221 ± 82 | 3.4 ± 2.3 |
| CBAB | 7.0 ± 0.8 | 389 ± 116 | 1.8 ± 0.7 |

C. Fine ATSP Powders Fabrication

Figure 7:
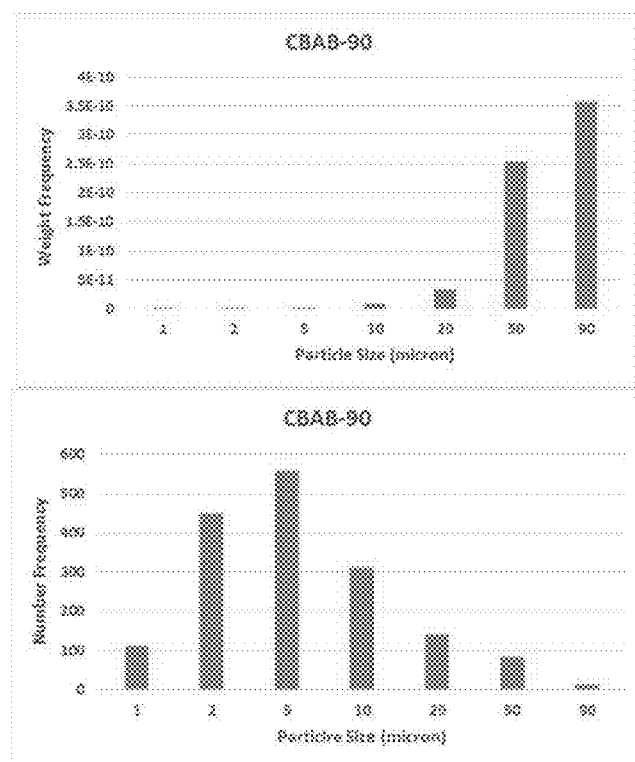
FIG. 7 illustrates particle size (weight and number) distribution of CBAB passed through 90 μm sieve.

CBAB foamed structure was ground to produce powders with controlled particle size distributions in the range of <90 μm. Fine particles were produced by grinding ATSP foam using a Col Int. Tech. FW 800 and automated screening through meshes of 90 μm using a Retsch® Sieve Shaker machine. FIG. 7 shows particle size distribution (weight and number frequency) of CBAB passed through 90 μm sieve.

D. Bulk ATSP Material Fabrication

For making fully dense CBAB, finely cured CBAB powders (<90 μm) were loaded into a (6¼"×6¼") mold and compressed at 1000 psi in a hot press under vacuum. The sample was heated to 340° C. over 2 hr and then sintered at 340° C. for 6 hr. The final product was a fully consolidated part with a density of 1.27 g/cm$^3$.

Dynamic mechanical analysis (DMA) was performed in a TA Instruments DMA Q800 to obtain the storage modulus and glass-transition temperature ($T_g$) of ATSP via a 3° C./min temperature ramp with a 1 Hz oscillation. Neat ATSP specimens were cut to 25 mm long by 7 mm wide by 1 mm thick and were loaded in a tensile clamp configuration. Dynamic thermal mechanical data as the storage modulus, loss modulus and tan δ as a function of temperature are shown in FIG. 8. The $T_g$ reported based on the tan δ peak was about 211° C. for C2A2, from Example 1.D, and 261° C. for CBAB. As expected, the $T_g$ of the material decreased with an increase in the number average molecular weight between crosslinks $M_c$ and lower rigidity of backbone units included within the oligomer set.

Isothermal heat stability of ATSP at 371° C. was also characterized in a TA Instruments TGA 2950 for fully dense C2A2 and CBAB structures. The ATSP samples were ramped up to 371° C. at a rate of 10° C./min and then held isothermally at that temperature for 3 hours in an air atmosphere. The weight loss at this temperature was about 8.17% for CBAB and 6.66% for C2A2, from Example 1.D (FIG. 9).

Figure 10:
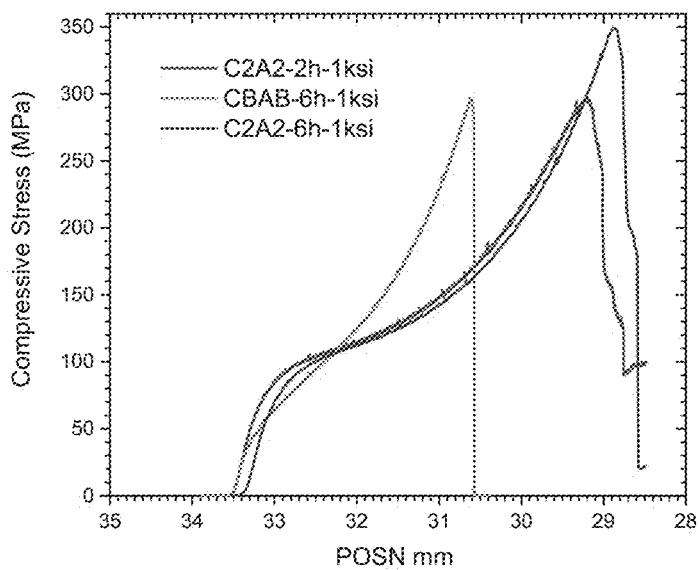
FIG. 10 illustrated the compression strength of C2A2 and CBAB fully dense structures.

The compression strength of ATSP fully dense materials was determined with guidance from ASTM D695-10. Cylindrical samples (5 mm in diameter and 10 mm in length) were machined out of bulk ATSP specimens and tested under compression in an Instron mechanical testing machine. The compressive strength is reported in FIG. 10. The ultimate compressive strength was 282.8±31.4 MPa for C2A2 sintered for 2 hr, from Example 1.D, 333.7±18.9 MPa for C2A2 sintered for 6 hr, from Example 1.D, and 303.8±11.1 MPa for CBAB sintered for 6 hr.

The tensile strength of ATSP bulk materials was determined with guidance from ASTM D638-14. The Type I sample specimen with the dumbbell shape and thickness of 7 mm were used for fully dense material and tested in tension with an Instron mechanical testing machine. The straight gage section had a length of 50 mm and a width of 13 mm.

Figure 11:
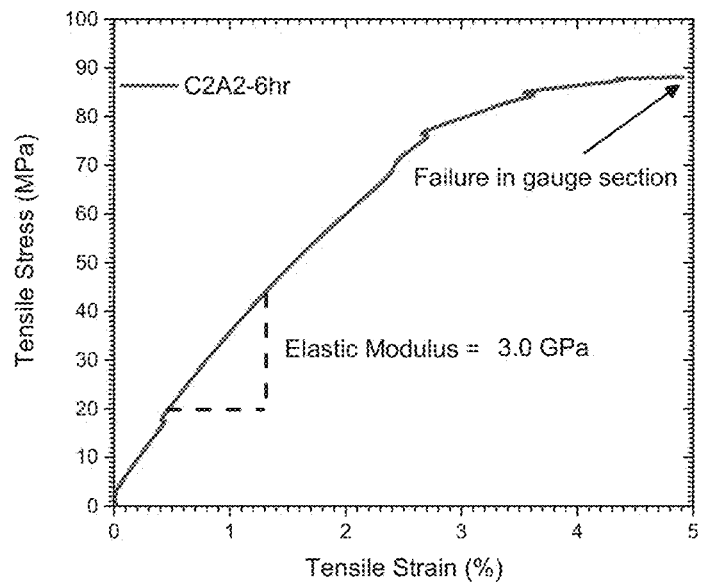
FIG. 11 illustrates the tensile strength vs strain of C2A2 fully dense structures.

The tensile strength vs strain results are reported in FIGS. 11 and 12 for fully dense C2A2 and CBAB parts, respectively. Ultimate tensile strength, percent elongation, and modulus are reported in Table 2. Tensile strength was reported as the breaking load divided by sample cross-sectional area, percent elongation was determined by extensometer, and modulus by dividing the difference in stress corresponding to any segment of section on this straight line by the corresponding difference in strain in the initial linear portion of the curve.

TABLE 2

Tensile properties of C2A2 and CBAB fully dense structures.

| Formulation | Tensile Stress (MPa) | Modulus (GPa) | Elongation (%) |
|---|---|---|---|
| C2A2 | 87.2 ± 1.5 | 3.2 ± 0.3 | 7.0 ± 2 |
| CBAB | 66.9 ± 1.6 | — | 3.0 ± 0.5 |

The coefficient of thermal expansion (CTE) for bulk ATSP specimens was measured on an Orton Dilatometer. ATSP (C2A2 and CBAB) samples were sectioned into 3×3×25 mm blocks. The specimen was placed in a dilatometer between quartz fixtures with a spring-drivennormal force holding onto the sample. The temperature was increased at a rate of 2° C./min from RT to 200° C. CTE for ATSP samples is reported in Table 3.

TABLE 3

CTE of ATSP bulk materials.

| ATSP Sample | CTE (1/K) |
|---|---|
| C2A2 | $38 \times 10^{-6}$ |
| CBAB | $41 \times 10^{-6}$ |

Tribological testing was conducted using a high-pressure tribometer (HPT) with a pin-on-disk contact geometry. The HPT simulates typical operating conditions found in an air-conditioning compressor. The disk samples were made of gray cast iron with a hardness of 95 HRB, while the pins were cut from the rectangular composite out of the mold. All experiments were performed at temperature of 25° C. and 60° C. under a load of 155 N. In order to make polymer pins for the pin-on-disk tribological tests, the ATSP fully dense specimen was machined down to pins with a diameter of 6.35 mm and a height of 11 mm.

TABLE 4

Tribological properties of neat C2A2 and CBAB pins.

| Formulation | Pressure (MPa) | Distance (m) | Weight loss (gram) | Wear rate (mm³/Nm) | COF | Temperature (° C.) |
|---|---|---|---|---|---|---|
| Neat C2A2 | 4.95 (155N) | 4320 | 0.0284 | 3.05E-6 | 0.46 | Fixed 25° C. |
| Neat C2A2 | 4.95 (155N) | 4320 | 0.00182 | 1.95E-6 | 0.39 | Fixed 60° C. |

Example 3—Fabricating Bulk ATSP with Various Densities

A. Materials and Oligomer Synthesis

The synthesis of a two part oligomeric system, one consisting of carboxylic end groups and the other consisting of acetoxy end groups was followed as described above.

B. ATSP Foam Structure Fabrication

ATSP foam structures (C2A2 and CBAB) were obtained by simply mixing together the two oligomer powders together via vigorous shaking in a container by hand followed by application of heat. CB and AB oligomer were mixed (C2:A2 at 1.1:1 and CB:AB at 1:1 weight ratio) and cured at 270° C. for 2 h following by 320° C. for 1 h. Curing was done under vacuum or nitrogen atmosphere to reduce oxidation.

C. Fine ATSP Powders Fabrication

C2A2 and CBAB foamed structures were ground and sieved to produce powders with controlled particle size distributions in the range of <90 μm and <250 μm. Powders were produced by grinding ATSP foam using a Col Int. Tech. FW 800 grinder and automated screening through mesh of 90 μm using a Retsch® Sieve Shaker machine. The larger powders were then sieved through 250 μm sieve.

FIGS. 3, 7 and 13 show particle size distribution (weight and number frequency) of C2A2 and CBAB passed through 90 and 250 μm sieves, respectively.

D. Bulk ATSP Material Fabrication

For the bulk C2A2 and CBAB materials, the cured powders were loaded into a (½"×2") compression mold and put in a hot press under vacuum. The samples were heated to 340° C. over 1.5 hr and then sintered at 340° C. for 0.5 hr with either no applied pressure or 1000 psi.

Table 5 shows density based on mesh size and applied pressure.

TABLE 5

Density of bulk ATSP based on the powder particle size.

| Formulation | Mesh Size | Density (g/cm³) | Applied Pressure (psi) |
|---|---|---|---|
| C2A2 | 90 μm | 1.32 | 1000 |
| C2A2 | 90 μm | 1.09 | 0 |
| C2A2 | 250 μm | 0.90 | 0 |
| CBAB | 90 μm | 1.27 | 1000 |
| CBAB | 90 μm | 0.89 | 0 |
| CBAB | 250 μm | 0.81 | 0 |

Figure 14:
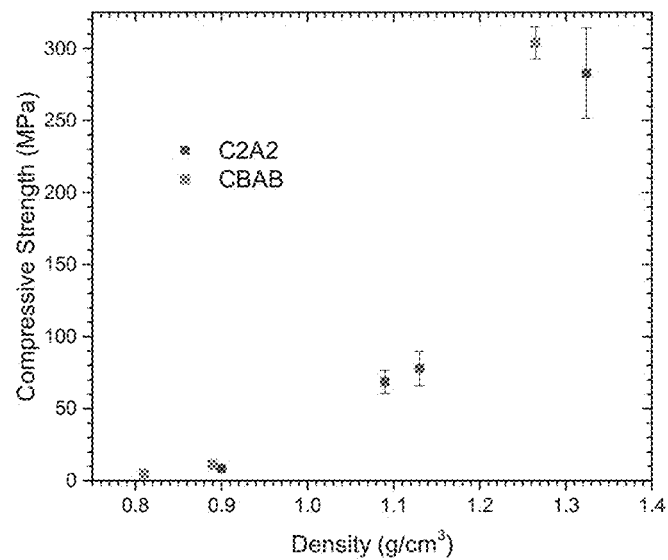
FIG. 14 illustrates the ultimate compression strength vs density.

The compression strength of ATSP fully dense materials was determined with guidance from ASTM D695-10. Cylindrical samples (5 mm in diameter and 10 mm in length) were machined and tested under compression in an Instron mechanical testing machine. The ultimate compressive strength vs density is reported in FIG. 14.

Example 4—Fabricating Fully Dense ATSP/PTFE Composite

A. Materials and Oligomer Synthesis

The synthesis of a two part oligomeric system, one consisting of carboxylic end groups and the other consisting of acetoxy end groups was followed as described above.

PTFE powder was purchased from Sigma-Aldrich and used without modification.

B. ATSP Foam Structure Fabrication

ATSP foam structures (C2A2 and CBAB) were obtained by simply mixing the two oligomer powders together via vigorous shaking in a container by hand followed by application of heat. CB and AB oligomer were mixed (C2:A2 at 1.1:1 and CB:AB at 1:1 weight ratio) and cured at 270° C. for 2 h following by 320° C. for 1 h. Curing was done under vacuum or nitrogen atmosphere to reduce oxidation.

C. Fine ATSP Powders Fabrication

C2A2 and CBAB foamed structures were ground and sieved to produce powders with controlled particle size distributions in the range of <90 μm. A Col Int. Tech. FW 800 was used for crushing and grinding the C2A2 and CBAB foam structures, the produced particles were then automatically screened through mesh of 90 μm using a Retsch® Sieve Shaker machine.

D. Fully Dense ATSP/PTFE Fabrication

For the bulk C2A2/PTFE and CBAB/PTFE materials, the cured C2A2 and CBAB powders were mixed with PTFE powder, respectively, via vigorous shaking in a container by hand. ATSP/PTFE of 75/25 wt % and 95/5 wt % were loaded into a (2"×2") compression mold and put in a hot press under vacuum and 1000 psi pressure. The samples were heated to 340° C. over 2 hr and then sintered at 340° C. for 6 hr. The final products were fully consolidated parts with density of 1.52 g/cm³ and 1.50 g/cm³ for C2A2/PTFE (75:25) and CBAB/PTFE (75:25) composites, respectively, and 1.37 g/cm³ for both C2A2/PTFE (95:05) and CBAB/PTFE (95:05) composites.

Figure 15:
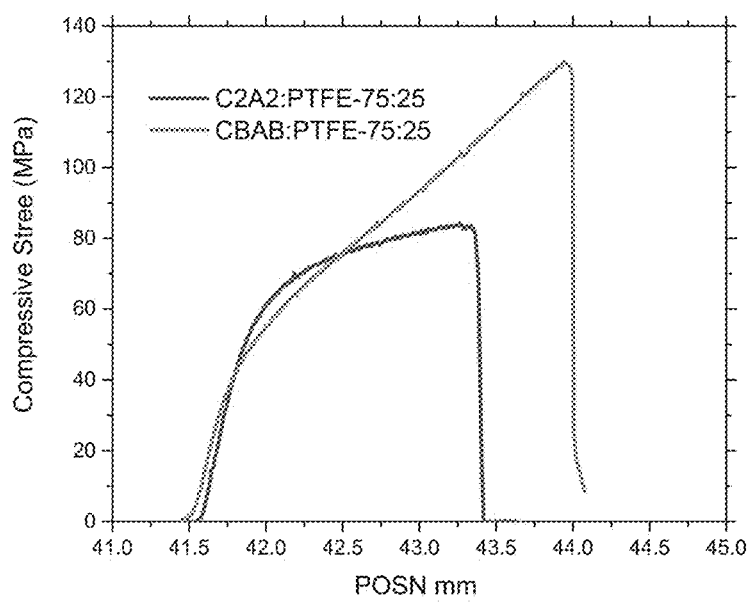
FIG. 15 illustrates the compression strength of ATSP/PTFE (75:25) fully dense structures.

The compression strength of ATSP fully dense materials was determined with guidance from ASTM D695-10. Cylindrical samples (5 mm in diameter and 10 mm in length) were machined and tested under compression in an Instron mechanical testing machine. The compressive strength is reported in FIGS. 15 and 16. The ultimate compressive strength was 84.04±1.54 MPa and 126.38±9.20 MPa for C2A2/PTFE (75:25) and CBAB/PTFE (75:25) fully dense composites, while 241.89±18.54 MPa and 267.16±13.69 MPa for C2A2/PTFE (95:05) and CBAB/PTFE (95:05) composites.

Figure 17:
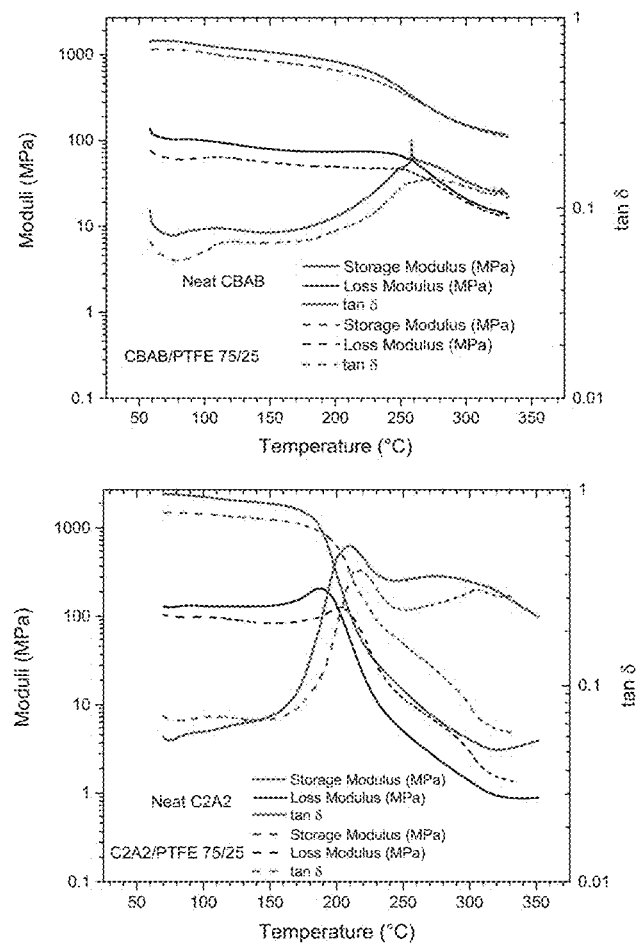
FIG. 17 illustrates DMA results for neat ATSP and ATSP/PTFE composite samples.

Dynamic mechanical analysis (DMA) was performed in a TA instruments DMA Q800 to obtain the storage modulus and $T_g$ of ATSP/PTFE (75:25) via a 3° C./min temperature ramp with a 1 Hz oscillation. Neat ATSP specimens were cut to 25 mm long by 7 mm wide by 1 mm thick and were loaded in a tensile clamp configuration. Dynamic thermal mechanical data as the storage modulus, loss modulus and tan δ as a function of temperature are shown in FIG. 17. The glass-transition temperature ($T_g$) reported based on the tan δ peak was about 218° C. for C2A2/PTFE (75:25), and 273° C. for CBAB/PTFE (75:25).

Figure 16:
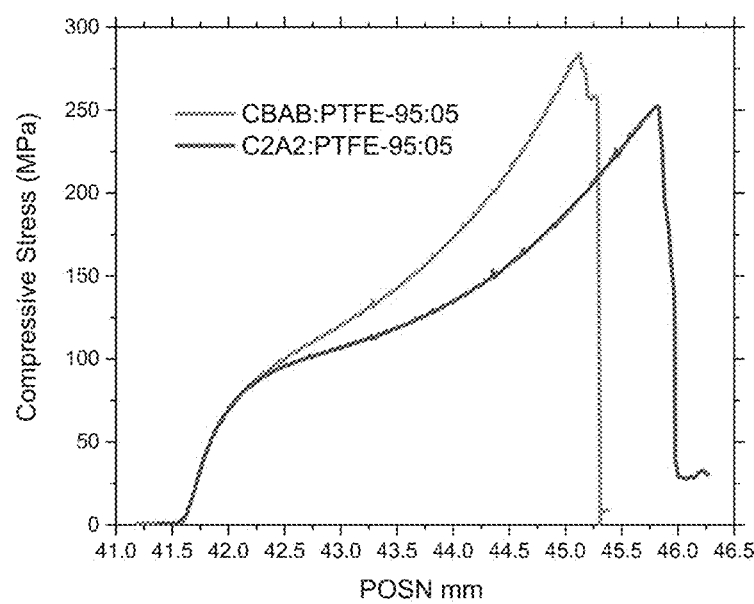
FIG. 16 illustrates the compression strength of ATSP/PTFE (95:05) fully dense structures.

Storage modulus is an important parameter for the rigidity of materials. FIG. 16 shows a very similar storage modulus curve to the pure ATSP. As seen, the storage modulus of the 75:25 composite is slightly lower than the neat ATSP sample over the entire temperature range Tribological testing was conducted using a high-pressure tribometer (HPT) with a pin-on-disk contact geometry. The HPT simulates typical operating conditions found in an air-conditioning compressor. The disk samples were made of gray cast iron with a hardness of 95 HRB, while the pins were cut from the rectangular composite out of the mold. All experiments were performed at temperature of 25° C. and 60° C. under a load of 230 N. The results are shown in Table 6.

In order to make polymer pins for the pin-on-disk tribological tests, the ATSP/PTFE composite was machined down to pins with a diameter of 6.35 mm and a height of 11 mm.

TABLE 6

Tribological properties of C2A2/PTFE and CBAB/PTFE pins.

| Formulation | Pressure (MPa) | Distance (m) | Weight loss (gram) | Wear rate (mm³/Nm) | COF | Temperature (° C.) |
|---|---|---|---|---|---|---|
| C2A2/PTFE (95:05) | 7.4 | 4320 | 0.00095 | 6.77E−07 | 0.365 | 25 |
| C2A2/PTFE (95:05) | 7.4 | 4320 | 0.00052 | 3.71E−07 | 0.249 | 60 |
| C2A2/PTFE (75:25) | 7.4 | 4320 | 0.00021 | 1.38E−07 | 0.264 | 25 |
| C2A2/PTFE (75:25) | 7.4 | 4320 | 0.0004 | 2.64E−07 | 0.241 | 60 |
| CBAB/PTFE (95:05) | 7.4 | 4320 | 0.0005 | 3.61E−07 | 0.491 | 25 |
| CBAB/PTFE (95:05) | 7.4 | 4320 | 0.0003 | 2.16E−07 | 0.468 | 60 |
| CBAB/PTFE (75:25) | 7.4 | 4320 | 0.00004 | 2.69E−08 | 0.314 | 25 |
| CBAB/PTFE (75:25) | 7.4 | 4320 | 0.00026 | 1.75E−07 | 0.265 | 60 |

Figure 18:
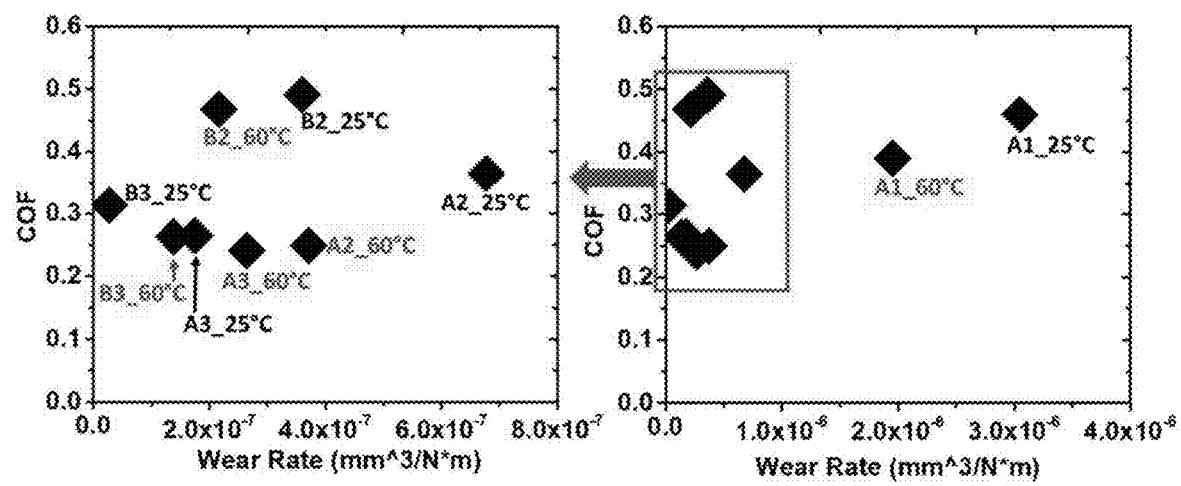
FIG. 18 illustrates COF versus wear rate for neat C2A2, CBAB as well as C2A2/PTFE and CBAB/PTFE composites pins.

FIG. 18 shows the COF versus wear rate for neat C2A2, CBAB along with C2A2/PTFE and CBAB/PTFE composites at 25 and 60° C. Where A1, A2, A3 denote pure C2A2, C2A2/PTFE (95:05), and C2A2/PTFE (75:25), respectively, and B2 and B3 denote CBAB/PTFE (95:05) and CBAB/PTFE (75:25), respectively.

Overall, within the same temperature, higher percentage of PTFE results in lower COF and lower wear rate. For the %25 ATSP composites, higher temperature results lower COF but higher wear rate. The % 25 ATSP composites, higher temperature results in lower COF and lower wear rate.

The PTFE:CBAB composites, in same temperature and concentration, have higher COF and lower wear rate compared with C2A2 composites.

Example 5—Nanocomposite Foam Synthesis

A. Materials and Oligomer Synthesis

The synthesis of a two part oligomeric system, one consisting of carboxylic end groups and the other consisting of acetoxy end groups was followed as described above.

B. Fabrication of Nanocomposite ATSP Foams

The carboxylic acid and acetoxy-capped oligomers (at 1:1 weight ratio) were mixed in the solid state as dry powders with carbon nanofillers of 3 wt. % at room temperature. The carbon nanofillers were either Nanoparticles, Nanotubes, or Platelet-Like Nanofillers, for example: Carbon Black Nanoparticles (CB) (Vulcan XC72, Cabot Corp., USA) (average particle radius of about 10-300 nm with a 325 mesh residue of <25 ppm; bulk density: 264 kg/m3), Carbon Nanotube (CNT) (Industrial-Grade Multi-Walled Carbon Nanotubes, US Research Nanomaterials, Inc., USA) (outside diameter (OD): 10-30 nm, inside diameter (ID): 5-10 nm, length: 10-30 μm, bulk density: 2100 kg/m3), and Graphene Nanoplatelet (GNP) (Grade M-5, XG Sciences, Inc., USA) (flake diameter: ~5 μm, thickness: 6-8 nm, density: 2200 kg/m3). We describe the neat foam and nanocomposite foam as neat ATSP and ATSP-Nanofiller Type, respectively.

The thermal cycle included two dwell stages at 202° C. for 90 minutes and 270° C. for 150 minutes, which corresponded to relaxation/melting of the constituent oligomers and nucleation/bubble growth through the release of the acetic acid, respectively. Additionally, the thermal cycle had a final cure stage at 330° C. for 90 minutes.

This method inherently provided a "soft-bed" (the ATSP being in powder form) for the carbon nanofillers during the mixing step, which helped to retain their as-produced pristine geometries (FIG. 3.*a*). This approach is in contrast to conventional liquid-phase shear-mixing based methods, which are known to be "nanofiller-averse," as they typically cause polymer nanocomposites to have broken nanofillers and aggregated nanofiller regions. Herein, as a result of our "nanofiller-friendly" processing method, the ATSP nanocomposite foams yielded significant structural property improvements.

Figure 19:
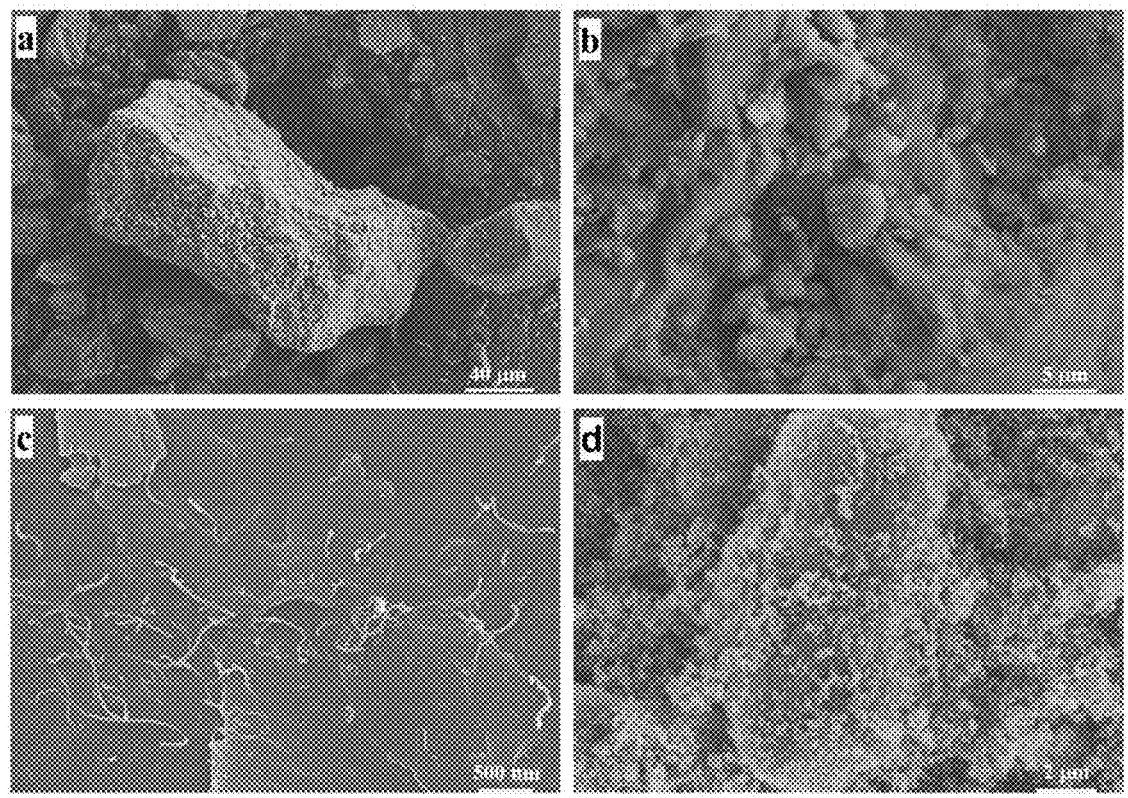
FIG. 19 illustrates decoration of individual oligomeric particles with nanofiller particles.

Also, the mixing process established a geometrical conformity between ATSP oligomer particles of ~100 μm in diameter and the carbon nanoparticles having micron-scale surface features, wherein the nanofillers formed additional short-range attractive interactions with the ATSP oligomer particles. Hence, the van der Waals forces between individual nanofiller particles were mitigated through the polymer-nanofiller interactions, which facilitated separation of the individual nanofillers in solid state prior to the polymerization process (FIG. 19 *b-d*). Hence, homogenous distribution of the carbon nanofillers at the micron scale was successfully achieved via the powder mixing technique.

Next, we report observations obtained during the polymerization reaction using a heating-stage assisted optical microscope. Briefly, when a temperature-ramp heating cycle was applied, oligomer particles melted at around 170° C. Then, the polycondensation reaction was observed to start at around 200° C., which was indicated by bubble formation in the melt. The acetic acid by-product was evolved as a gas as it was well above its boiling point of 118° C. When the temperature was further increased through the polymerization reaction, the gaseous acetic acid formed a porous morphology within the oligomer melt medium. From prior studies, at elevated temperatures (~290° C.), temperature-driven hydrodynamic motion within the melt apparently caused relocation of the blowing agent bubbles, which in this study enabled redistribution and then rearrangement of the nanofiller particles in the molten domain prior to the curing.

We analyzed thermal characteristics of the polymerization reaction for each powder combination applying a temperature-ramp heating cycle in the DSC. FIG. 20 shows cure and post-cure behaviors of the three combinations (ATSP-CNT, ATSP-GNP, and ATSP-CB) in comparison to a parent ATSP powder. We observed that all the powder combinations, as well as the neat ATSP powder, exhibited endothermic profiles during the heating cycle due to the condensation polymerization reaction carried on between the oligomer groups. In the heat flux curves, the combinations initially formed a dimple at around 75-80° C. indicating softening of the oligomer groups. Following this, melting of the oligomers started which displayed isothermal-plateau regions extending until about 200° C. where the polycondensation reaction started. Then, the GNP and CNT combinations showed sharp downward trends corresponding to sudden heat uptakes into their melt systems. We attributed such abrupt behaviors to acetic acid discharge-driven bubble growth during the polycondensation reaction through the presence of the carbon fillers. This behavior can be detailed with the homogenous bubble nucleation model (classical nucleation theory). The model defines Gibbs free energy ($\Delta G$) as the driving factor for bubble nucleation and growth being functions of volume free energy ($\Delta G_v$) (energy difference between the gas and polymer phases) and gas-liquid (bubble-polymer) interface surface energy ($\gamma$). Hence, as the carbon nanofillers increased the viscosity of the molten domains, the blowing agent (acetic acid) would require much more heat energy ($\Delta G_v$) to overcome present viscous forces ($\gamma$) while working towards maintaining bubble growth, which yielded those endothermic features in the heat curves. After that, the powder combinations revealed distinct cure regions between 270° C. and 330° C. temperature range. The cure regions of the combinations had slightly broader temperature window as well as stronger endothermic nature than the parent material. Moreover, especially in the GNP and CNT combinations, the peak cure temperature slightly shifted to a lower value (~300° C.), which could have two underlying reasons. First, the increased melt viscosities for thermosets could cause early initiation of gelation and cross-linking at relatively lower temperatures. Second, the reactive functional groups of the oligomers could graft onto carbon nanofillers that would alter viscous characteristics of the molten domain prompting a lower temperature curing. Following the cure cycles, we subsequently performed post-cure analyses of the corresponding combinations. Nearly-flat isothermal characteristic curves, without any features of the prior curing processes, were obtained for all of the combinations, which clearly indicated their sufficiently cured conditions. Overall, we observed that the GNP and CNT could marginally change cure characteristics of the powder combinations, yet conclusive remarks would require further systematic rheological and spectroscopical analyses.

Additionally, thermogravimetric characteristics of the polymerization reaction for the powder combinations were measured using the TGA. Heating cycle included two stages: temperature-ramp until 330° C. (the final cure temperature used in the heating cycle), and isothermal temperature-hold at 330° C. for 90 minutes. FIG. 21 shows the TGA analysis of cure and post-cure characteristics of the nanofiller-ATSP powder combinations. The Tests were performed under nitrogen and the heating rate was about 10° C./min. The main characteristic of the thermogravimetric curves was the substantial weight loss occurred between 15-40 min. time-window, corresponding to 200-330° C. temperature-range. Such a steep decrease (~15 wt. % of the initial combination) took place as a result of the acetic acid emission being the by-product of the polycondensation reaction. The results did not reveal any notable differences among the powder combinations as well as the parent ATSP powder. It indicated that the polymerization reaction ordinarily progressed successfully forming the ATSP backbone of the nanocomposite foams. The subsequent gradual decline in the thermogravimetric curves within the temperature-hold region (40-120 min.) corresponded to cross-linking formation wherein only small weight loss occurred. The slight mass losses happened due to thermal degradation of reactive functional groups in the course of curing at high temperature. Afterward, post-cure cycles of the corresponding combinations demonstrated nearly-flat thermogravimetric curves indicating effectively cured conditions of the combinations during the first cycles.

Microstructural analyses on the nanocomposite foams were conducted using SEM, as shown in FIG. 22. Low-magnification images clearly displayed porous morphologies of the nanocomposite foams (FIG. 6.*a-b*) which evinced that the polymerization reaction successfully developed during the fabrication cycle. Furthermore, high-magnification images showed the carbon nanofiller particles dispersed in the ATSP matrix. Although such microscale images were not conclusive about overall macroscale distributions of the nanofillers, we did not observe any significant agglomeration regions formed in the matrix. In particular, the GNP nanofillers were very well distributed in the ATSP matrix (FIG. 22.c) while preserving their pristine geometries (as-fabricated GNP flake size was ~5 μm) (FIG. 22.d). Also, CNT nanofillers (FIG. 22.e) displayed small aggregation sites, about 5 μm in diameter, while CNTs easily bundled up. Micron-size oligomer particles did not necessarily penetrate through very small distances (on the order of nanometers) between individual CNTs. However, those aggregation sites were very well infiltrated and enclosed by the ATSP matrix upon polymerization which enabled CNT to behave like micron size fibers. Interestingly, CNTs preferentially self-aligned along pore surfaces, which could be one of the factors that yielded significant improvements in the mechanical properties, as explained later. Additionally, CB particles (FIG. 22.f) demonstrated micron-scale segregation groups in the matrix, which in fact was an overall good dispersion condition for the individually nanosized particles. In summary, based on the SEM images, the nature of the mixing process allowed effective dispersion of the GNPs due to the aforementioned geometrical conformity. However, further studies using transmission electron microscopy would help to understand the dispersion of the nanoparticles at finer scales.

Figure 23:
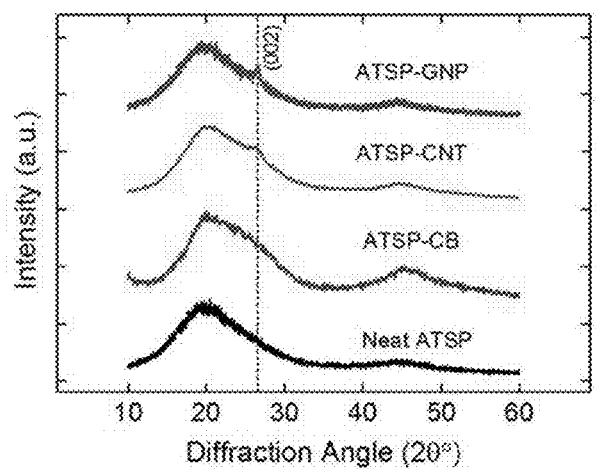
FIG. 23 illustrates the microstructure of ATSP nanocomposite foams via x-ray diffractometry.

In addition to the microstructural analysis, phase morphologies of the ATSP nanocomposite foams were characterized using XRD, as shown in FIG. 23. The neat ATSP foam demonstrated a very broad primary peak centered around 2θ=20°, which was expected due to amorphous polymer morphology. The nanocomposite foams displayed similarly broad primary peaks, which indicated that amorphous nature of the host ATSP matrix likewise was preserved. We also observed several characteristic effects arising from the carbon nanofillers. We note that hexagonal lattice structure of graphitic carbon displays a (002) diffraction peak, which gives rise to a broad peak in CB and sharp peaks in CNT and GNP. In that regard, the CB nanofiller generated a shoulder on the primary amorphous ATSP peak. These features suggest that highly disordered (amorphous) form of the pristine CB in the matrix caused peak broadening while being well incorporated into the matrix. On the other hand, having highly crystalline sp2 hybridized networks, the CNT and GNP nanofiller incorporated foams revealed sharp characteristic peaks of the carbon morphology, which also indicated that relatively pristine geometries of the nanofillers remained intact during the fabrication process. Such low intensities of the carbon peaks (as compared to that of the primary peak) indicated effective interactions with the host matrix. Also, quite low carbon nanofiller loadings (3 wt. %) could cause the low intensity for the characteristic carbon peaks.

Figure 24:
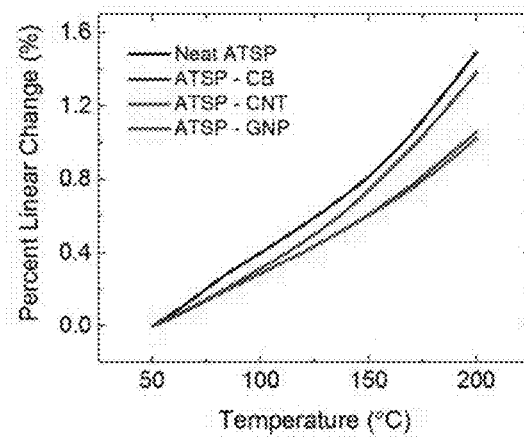
FIG. 24 illustrates linear thermal expansions on the neat foam and the nanocomposite foams.

The negative CTE of graphene was demonstrated to reduce thermal expansion of polymer nanocomposite. This finding indicates a strong compatibility between carbon nanoparticles and the host matrix. Hence, we analyzed linear thermal expansion characteristics of the nanocomposite foam structures using a dilatometer, as shown in FIG. 24. We observed that linear expansion ratios tended to decrease for the nanocomposite morphologies. In particular, CNT and GNP nanocomposite foams displayed about 1.1% linear expansions, in the longitudinal direction, as CTEs were calculated to be $75 \times 10^{-6}$ °C.$^{-1}$. The neat ATSP foam had about 1.5% linear expansion with CTE of $100 \times 10^{-6}$ °C.$^{-1}$. Such substantial decreases (~25%) in the CTE for the nanocomposite foams were indicative of favorable interfacial interactions between the GNP and CNT nanofillers with the ATSP matrix, which could result in altered chain relaxation behaviors. Note that ATSP-CB nanocomposite foams did not show a significant difference from the neat foam.

FIG. 25 shows thermal degradation stability characteristics of the nanocomposite foams measured using TGA. We evaluated thermal performances of the nanocomposites based on two reference temperature metrics: 5% weight loss and the peak position of the mass derivative. In that regard, we observed that the 5% weight loss temperatures increased by around 20-30° C. for the nanocomposite foams. Similarly, the peak temperatures positively shifted by about 4-8° C. As well, the nanocomposite foams had the mass derivative rates (which is the thermal degradation rate) marginally suppressed in comparison to the neat foam. The formations of chemical bonds or modifications in chemical structures could cause either positive or negative temperature shifts in thermal decomposition behaviors of polymers. Hence, the non-functionalized carbon nanofillers could graft onto the ATSP chains that would yield the improved thermal degradation responses. The enhancements in thermal performances of the ATSP nanocomposite foams are noteworthy due to the already exceptionally high thermal performance of the neat ATSP foam. Lacking further evidence on this point, we also understand that the carbon nanofillers constituted thermal barriers that could protect the ATSP backbone from further thermal effects, thereby bond scissions were slowed down during the courses of thermal degradation processes.

Lastly, we discuss compressive behaviors and mechanical characteristics of the ATSP nanocomposite foams. Representative compressive stress-strain curves of the nanocomposite foams revealed two distinct features: increased compressive strength and extended compressive strain ratio at fracture as demonstrated in FIG. 26. In other words, the nanocomposite foams possessed remarkably stronger, though not necessarily stiffer, and more damage-tolerant morphologies as compared to the neat ATSP foams. Regarding the mechanical strength, earlier studies on polymer nanocomposites (bulk forms) demonstrated that the carbon nanofillers improved mechanical properties, yet such significant jumps (up to two-times) observed in this study are quite substantial for the given low-density porous morphologies. More importantly, improved mechanical properties in the polymer nanocomposites came generally along with deformation penalty in which the nanocomposites obtained more brittle characteristics. However, the ATSP nanocomposite foams uniquely enabled simultaneous increases in the strength and the maximum strain, meaning improved material toughness. Hence, the ATSP nanocomposite foams bear exclusive mechanical characteristics that could potentially address conflicts of strength versus toughness in lightweight structural material designs.

Comprehensive mechanical properties of the nanocomposite foams are presented in FIG. 27. The compressive mechanical strengths of the nanocomposite foams enhanced by 38.1% (10.5±2.2 MPa) with CB, 109.2% (15.9±2.8 MPa) with CNT and 101.3% (15.3±1.6 MPa) as compared to the neat ATSP foam (7.6±0.5 MPa) (FIG. 27.a). Also, while the neat foam could maintain 5.3±1.1% strain ratio at the maximum compressive stress, that property was extended by 31.1% (7±1.5%) with CB, 78.1% (9.5±1.2%) with CNT and 46.6% (7.8±1.2%) with GNP (FIG. 27.b). In addition, Young's Modulus improved by 3.7% (0.28±0.04 GPa) with CB, 25.9% (0.34±0.15 GPa) with CNT and 74% (0.47±0.04 GPa) with GNP (FIG. 27.c) compared to parent foam (0.27±0.04 GPa). Similarly, structural densities of the nanocomposite foams increased by 9.2% (0.59±0.03 Mg/m$^3$)

with CB, 33.3% (0.72±0.01 Mg/m$^3$) with CNT and 38.9% (0.75±0.04 Mg/m$^3$) with GNP in comparison to neat the ATSP foam (0.54±0.03 Mg/m$^3$) (FIG. 27.d). Thus, the nanocomposite foams had higher relative densities of 0.46±0.03 with CB, 0.56±0.01 with CNT and 0.59±0.04 with GNP as compared to 0.42±0.03 of the neat ATSP foam.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the sprint and scope of the invention.

We claim:

1. A method of synthesizing a foam comprising:
preparing a solid state dry powder comprising an aromatic thermosetting copolyester, and wherein the aromatic thermosetting copolyester is selected from the group consisting of: an aromatic thermosetting copolyester comprising a first oligomer having a carboxylic acid end group and a second oligomer having an acetoxy end group;
mixing the solid state dry oligomeric powder with a carbon nanofiller;
thermal cycling the mixture of the solid state dry powder with the carbon nanofiller, and wherein the thermal cycling is configured to cause melting, and wherein the thermal cycling includes a two dwell stage thermal cycle defined to include a first dwell stage set at about 202° C. for about 90 minutes and a second dwell stage set at about 270° C. for about 150 minutes; and
curing the mixture to cause a reaction between the carbon nanofiller and the aromatic thermosetting copolyester to structurally link chemically the carbon nanofiller and first and second oligomer chains to form a chemically contiguous structure foam material.

2. The method of claim 1, wherein the carbon nanofiller is Carbon Black nanofiller having an average particle radius of about 10-300 nm with a 325 mesh residue of <25 ppm.

3. The method of claim 1, wherein the carbon nanofiller is Carbon Nanotube having an average outside diameter of 10-30 nm and an inside diameter of 5-10 nm and an length of about 10-30 µm.

4. The method of claim 1, wherein the carbon nanofiller is Graphene Nanoplatelet having a flake diameter of about 5 µm and a thickness of about 6-8 nm.

5. The method of claim 1, wherein the ratio of carboxylic acid end groups to acetoxy end groups is approximately 1:1.

6. The method of claim 1, wherein the aromatic thermosetting copolyester is formed by crosslinking the first oligomer and the second oligomer by curing in the presence of a catalyst.

7. A method of synthesizing a foam comprising:
preparing a solid state dry powder comprising an aromatic thermosetting copolyester, and wherein the aromatic thermosetting copolyester is selected from the group consisting of: an aromatic thermosetting copolyester comprising a first oligomer having a carboxylic acid end group and a second oligomer having an acetoxy end group;
mixing the solid state dry oligomeric powder with a carbon nanofiller;
thermal cycling the mixture of the solid state dry powder with the carbon nanofiller, and wherein the thermal cycling is configured to cause melting; and
curing the mixture to cause a reaction between the carbon nanofiller and the aromatic thermosetting copolyester to structurally link chemically the carbon nanofiller and first and second oligomer chains to form a chemically contiguous structure roam material end wherein the curing step is set at about 330° C. for about 90 minutes.

8. The method of claim 1 further comprising the steps of pressing the foam above a glass transition temperature to form a composite material.

9. The method of claim 8, wherein the pressing step is achieved at about 1000 psi at about 330° C.

10. The method of claim 8, wherein the step of pressing the foam includes a previous step of grinding the foam.

11. The method of claim 10, wherein the step of grinding the foam includes grinding the foam to pass through a 90 µm sieve.

12. A method of synthesizing a foam comprising:
preparing a solid state dry powder comprising an aromatic thermosetting copolyester, and wherein the aromatic thermosetting copolyester is selected from the group consisting of: an aromatic thermosetting copolyester comprising a first oligomer having a carboxylic acid end group and a second oligomer having an acetoxy end group;
mixing the solid state dry oligomeric powder with a carbon nanofiller;
thermal cycling the mixture of the solid state dry powder with the carbon nanofiller, and wherein the thermal cycling is configured to cause melting; and
curing the mixture to form a chemically contiguous structural foam material and wherein the curing step is set at about 330° C. for about 90 minutes.

13. The method of claim 12, wherein the carbon nanofiller is selected from one of the following: Carbon Black, Carbon Nanotube, and Graphene Nanoplatelet.

14. A method of synthesizing a foam comprising:
preparing a solid state dry powder comprising n aromatic thermosetting copolyester, and wherein the aromatic thermosetting copolyester is selected from the group consisting of: an aromatic thermosetting copolyester comprising a first oligomer having a carbolic acid end group and a second oligomer having an acetoxy end group;
mixing the solid state dry oligomeric powder with a carbon nanofiller;
thermal cycling the mixture of the solid state dry powder with the carbon nanofiller, and wherein the thermal cycling is configured to cause melting; and
curing the mixture to form a chemically contiguous structural foam material and wherein the thermal cycling step includes a two dwell stage thermal cycle defined to include a first dwell stage set at about 202° C. for about 90 minutes and a second dwell stage set at about 270° C. for about 150 minutes.

15. The method of claim 12 further comprising the steps of pressing the foam above a glass transition temperature to form a composite material.

16. The method of claim 15, wherein the pressing step is achieved at about 1000 psi at about 330° C.

17. The method of claim 15, wherein the step of pressing the foam includes a previous step of grinding the foam.

18. The method of claim 12, wherein the step of grinding the foam includes grinding the foam to pass through a 90 µm sieve.

* * * * *